(12) United States Patent
Reichard et al.

(10) Patent No.: US 10,896,079 B2
(45) Date of Patent: *Jan. 19, 2021

(54) COMMON GATEWAY PLATFORM

(71) Applicant: Rockwell Automation Technologies Inc., Mayfield Heights, OH (US)

(72) Inventors: Douglas J. Reichard, Fairview Park, OH (US); Nicholas J. Marangoni, Peninsula, OH (US); Stephen C. Briant, Moon Township, PA (US); Sonal R. Dubey, Cleveland, OH (US); Sharath Chander Reddy Baddam, Mayfield Heights, OH (US); Paul C. Whitten, Chardon, OH (US); Deepa S. Bekal, Reminderville, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/673,604

(22) Filed: Nov. 4, 2019

(65) Prior Publication Data

US 2020/0065170 A1 Feb. 27, 2020

Related U.S. Application Data

(63) Continuation of application No. 15/719,960, filed on Sep. 29, 2017, now Pat. No. 10,467,072.

(Continued)

(51) Int. Cl.
*G06F 9/54* (2006.01)
*H04L 29/08* (2006.01)
*G05B 19/418* (2006.01)

(52) U.S. Cl.
CPC ......... *G06F 9/547* (2013.01); *G05B 19/4185* (2013.01); *G06F 9/541* (2013.01); *H04L 67/125* (2013.01); *H04L 67/28* (2013.01)

(58) Field of Classification Search
None
See application file for complete search history.

(56) References Cited

U.S. PATENT DOCUMENTS

2004/0158842 A1    8/2004   Gilfix et al.
2005/0267947 A1   12/2005   Patrick et al.
(Continued)

FOREIGN PATENT DOCUMENTS

EP           3062032 A1    8/2016
WO   2014148865 A1    9/2014

OTHER PUBLICATIONS

International Business Machines Corporation (IBM) Eurotech, "MQTT V3.1 Protocol Specification", MQTT V3.1 Protocol Specification, Jan. 1, 2014, pp. 1-33, XP055499669, http://dhe.ibm.com/software/dw/webservices/ws-mqtt/mqtt-v3r1.html, [retrieved on Aug. 14, 2018].

(Continued)

*Primary Examiner* — Shih-Wei Kraft

(57) ABSTRACT

Systems, methods, and software disclosed herein relate to a common gateway platform system. In an implementation, program instructions direct a computing system to execute a common gateway platform environment comprising an adapter comprising an adapter name identification, a broker connected to the adapter, and an application connected to the adapter. The application also generates an action configured according to a common gateway platform protocol, transmit the action to the broker, and receive a reaction from the broker. The broker is configured to identify the adapter based on the adapter identifier and transmit the action to the adapter. The broker also receives the reaction from the adapter and transmit the reaction to the application. The adapter is configured to acquire the data from the industrial automation environment based on an adapter instruction in (Continued)

the action, generate the reaction comprising the acquired data, and transmit the reaction to the broker.

20 Claims, 6 Drawing Sheets

Related U.S. Application Data

(60) Provisional application No. 62/481,944, filed on Apr. 5, 2017.

(56) References Cited

U.S. PATENT DOCUMENTS

| | | |
|---|---|---|
| 2005/0267952 A1 | 12/2005 | Ricciardi et al. |
| 2006/0209868 A1 | 9/2006 | Callaghan |
| 2010/0011374 A1 | 1/2010 | Cho et al. |

OTHER PUBLICATIONS

International Business Machines Corporation (IBM) et al, "MQTT V3.1 Protocol Specification," retrieved from the internet URL: http://public.dhe.ibm.com/software/dw/webservices.ws-mqtt/mqtt-v3r1.html, retrieved on Aug. 14, 2018, pp. 1-33, dated Jan. 1, 2014.

COMMON GATEWAY PLATFORM

RELATED APPLICATIONS

This application claims the benefit of, and priority to U.S. patent application Ser. No. 15/719,960 entitled "COMMON GATEWAY PLATFORM," filed on Sep. 29, 2017, and U.S. Provisional Patent Application No. 62/481,944, entitled "COMMON GATEWAY PLATFORM", filed Apr. 5, 2017, both of which are hereby incorporated by reference in their entirety for all purposes.

TECHNICAL BACKGROUND

Aspects of the disclosure are related to computing hardware and software technology, and in particular to industrial automation applications.

Industrial controllers and their associated I/O devices are central to the operation of modern automation systems. These controllers interact with field devices on the plant floor to control automated processes relating to such objectives as product manufacture, material handling, batch processing, supervisory control, and other such applications. Industrial controllers store and execute user-defined control programs to effect decision-making in connection with the controlled process. Such programs can include, but are not limited to, ladder logic, sequential function charts, function block diagrams, structured text, or other such programming structures.

Because of the large number of system variables that must be monitored and controlled in near real-time, industrial automation systems often generate vast amounts of near real-time data. In addition to production statistics, data relating to machine health, alarm statuses, operator feedback (e.g., manually entered reason codes associated with a downtime condition), electrical or mechanical load over time, and the like are often monitored, and in some cases recorded, on a continuous basis. This data is generated by the many industrial devices that can make up a given automation system, including the industrial controller and its associated I/O, telemetry devices for near real-time metering, motion control devices (e.g., drives for controlling the motors that make up a motion system), visualization applications, lot traceability systems (e.g., barcode tracking), etc. Moreover, since many industrial facilities operate on a 24-hour basis, their associated automation systems can generate a vast amount of potentially useful data at high rates. For an enterprise with multiple plant facilities, the amount of generated automation data further increases The large quantity of data generated by modern automation systems makes it possible to apply a broad range of plant analytics to the automation systems and processes that make up an industrial enterprise or business. Reports, charts, and other human-readable formats are often available or may be created for plant personnel and others wishing to monitor and review the generated data in either a real-time mode or at a later time after the data has been stored.

In one scenario, applications and other software implemented to acquire the industrial automation data for purposes of such as those described above must be able to discover where the data stores are located in the system, be able to interact via the protocol of each data store, and appropriately translate/interpret the data from each data store in order to acquire the data stored therein. Referring to FIG. 1, a prior art data acquisition environment 2 includes a computing device 4 accesses or executes an application 6 configured to acquire data for reporting purposes, for example. The data to be reported may be stored, in this example, in any one or all of a plurality of data storages such as a historian database 8, a file system on a hard drive 10, and a relational database 12 such as a Structured Query Language (SQL) database. To acquire or obtain the relevant stored data, application 6 must know not only how to find each of the data storages 8-12, but it must also be able to communicate with each of the data storages 8-12 in their respective protocols. This requires the application 6 to know the protocols of every data storage location from which the data is to be obtained. If data to be acquired by the application 6 is changed to a different protocol, whether known or unknown to the application 6, or is changed to a different location, the application 6 must be modified in order to track the change. Accordingly, any protocol or location change to any of the data storages 8-12 requires the application to be changed and updated as well.

The above-described deficiencies are merely intended to provide an overview of some of the problems of conventional systems, and are not intended to be exhaustive. Other problems with conventional systems and corresponding benefits of the various non-limiting embodiments described herein may become further apparent upon review of the following description.

Overview

Examples discussed herein relate to a common gateway platform system. In an implementation, one or more computer-readable storage media have program instructions stored thereon, wherein the program instructions, when executed by a computing system, direct the computing system to execute a common gateway platform environment comprising an adapter with a name identifier; a broker connected to the adapter; and an application connected to the broker. The application is configured to generate an action configured according to a common gateway platform protocol and comprising an adapter identifier configured to identify the adapter by its adapter name identification; and an adapter instruction for the adapter to acquire data from an industrial automation environment communicatively connected to the adapter. The application is also configured to transmit the action to the broker and receive a reaction from the broker, the reaction comprising the data acquired from the industrial automation environment by the adapter. The broker is configured to receive the action from the application; identify the adapter based on the adapter identifier; transmit the action to the adapter; receive the reaction from the adapter; identify the application based on the reaction; and transmit the reaction to the application. The adapter is configured to receive the action from the broker; acquire the data from the industrial automation environment based on the adapter instruction; generate the reaction comprising the acquired data; and transmit the reaction to the broker.

In another implementation, a method of acquiring data generated by an industrial automation machine in an industrial automation environment comprises transmitting, from an application, an action to a broker, the action configured according to a common gateway platform protocol and comprising an adapter identifier and an adapter instruction configured to cause an adapter to acquire the data generated by the industrial automation machine. The method also comprises determining, via the broker, the adapter based on the adapter identifier; routing, via the broker, the action to the adapter; and acquiring, via the adapter, the data generated by the industrial automation machine. The method also comprises transmitting, from the adapter, a reaction to the broker, the reaction configured according to the common gateway platform protocol and comprising the data generated by the industrial automation machine; and routing, via the broker, the reaction to the application.

In another implementation, a system to acquire data generated by an industrial automation machine in an industrial automation environment comprises a machine system comprising the industrial automation machine and a common gateway platform system. The common gateway platform system comprises one or more applications; one or more brokers communicatively connected to the one or more applications; and a plurality of adapters communicatively connected to the one or more brokers. A first application of the one or more applications is configured to: transform a data request received from a client into an action message, wherein the action message is configured according to a common gateway platform protocol and wherein the data request is configured according to a data request protocol different from the common gateway platform protocol; and transmit the action message to a first broker of the one or more brokers. The first broker is configured to identify a first adapter of the plurality of adapters based on the action message; and transmit the action message to the first adapter. The first adapter is configured to acquire the data generated by an industrial automation machine based on a processing of the action message; and transmit the data generated by an industrial automation machine to the first application via the broker via a reaction message created by the first adapter based on the data generated by an industrial automation machine.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Before any embodiments are explained in detail, it is to be understood that the embodiments described herein are not limited in their application to the details of construction and the arrangement of components set forth in the following description or illustrated in the following drawings. Embodiments may be practiced or carried out in various ways.

Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "connected" and "coupled" are used broadly and encompass both direct and indirect mounting, connecting, and coupling. Further, "connected" and "coupled" are not restricted to physical or mechanical connections or couplings, and may include electrical connections or couplings, whether direct or indirect. Also, electronic communications and notifications may be performed using any known means including direct or indirect wired connections, wireless connections, and combinations thereof. Also, functionality described as being performed by one device may be distributed among a plurality of devices.

It should also be noted that a plurality of hardware and software based devices, as well as a plurality of different structural components may be used to implement the embodiments set forth herein. In addition, it should be understood that embodiments may include hardware, software, and electronic components that, for purposes of discussion, may be illustrated and described as if the majority of the components were implemented solely in hardware. However, one of ordinary skill in the art, and based on a reading of this detailed description, would recognize that, in at least one embodiment, the electronic-based aspects of the embodiments may be implemented in software (e.g., stored on non-transitory computer-readable medium) executable by one or more electronic processors.

Figure 1:
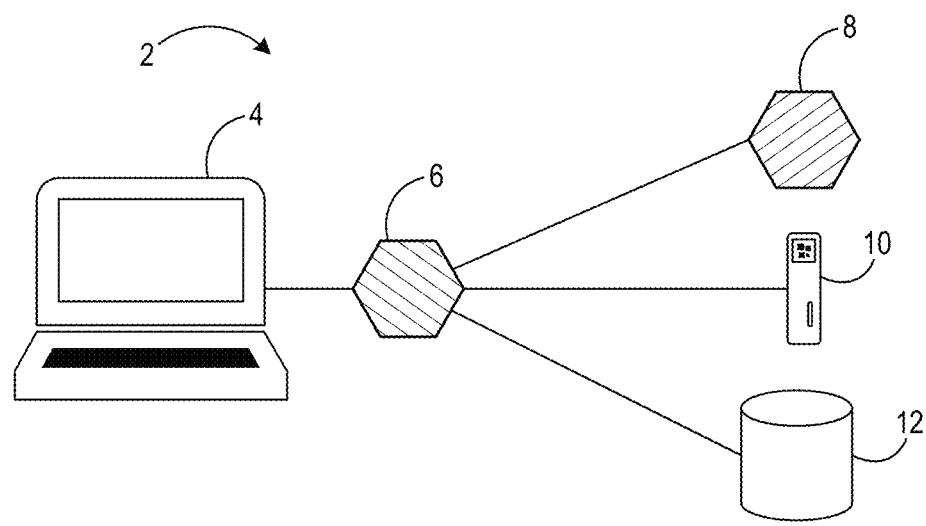
FIG. 1 illustrates a prior art schematic block diagram of a prior art data acquisition environment in one implementation.
Figure 2:
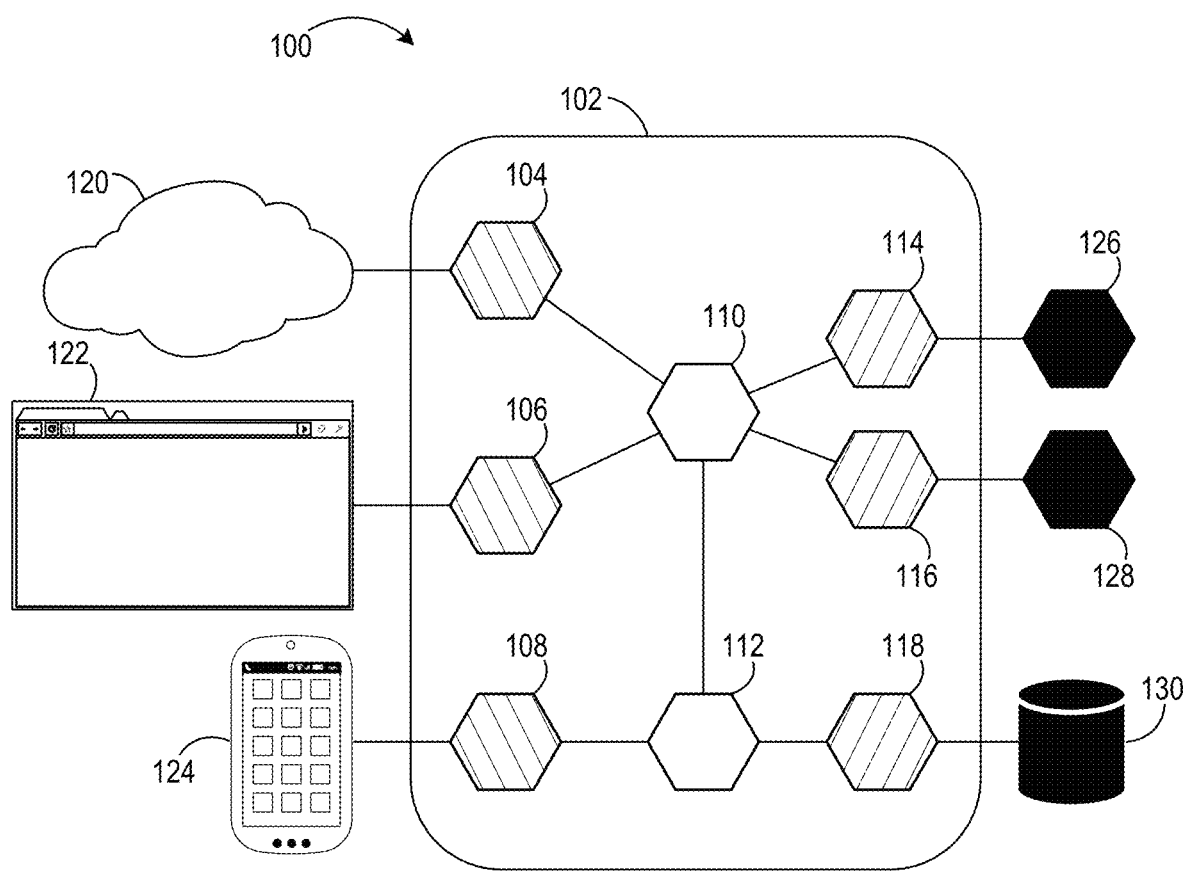
FIG. 2 is a block diagram that illustrates a common gateway platform environment in an exemplary implementation.

FIG. 2 illustrates a common gateway platform environment 100 in an exemplary implementation. A common gateway platform 102 includes one or more applications 104-108 in communication with one or more brokers 110-112, which are in turn in communication with one or more adapters 114-118. Each application 104-108 may be accessed or executed by one or more clients 120-124 and may seek data stored or contained in data storages or data storage devices 126-130 coupled to adapters 114-118.

Applications 104-108, when directed by clients 120-124 in one implementation, seek to acquire data stored in one or more of data storages 126-130 in order to deliver or transmit the data to clients 120-124. In another implementation, the applications 104-108 themselves may be programmed to seek and use the data for other purposes. The applications 104-108 may be executed and run in an environment on a client 120-124 such as in a mobile device client 124. In another embodiment, applications 104-108 may be executed and run in an environment separate from clients 120-124.

Brokers 110-112 facilitate connection of applications 104-108 to data storages 126-130. Brokers 110-112 receive data communications from applications 104-108, and route the data communications to the appropriate adapter 114-118 configured to acquire the data requested by the requesting application 104-108. Brokers 110-112 may also optimize the data requested by the applications 104-108 to reduce the amount of traffic flow in the environment 100. Optimization may include consolidating duplicate data requests or data requests for the same data by multiple applications 104-108 to reduce traffic. For example, two or more applications 104-108 may request the same data from one of the data storages 126-130. In this case, the broker may consolidate the multiple data requests into a single action for retrieving the data from the target data storage 126-130. When the requested data is returned, the broker may then distribute the data to the multiple requesting applications 104-108. Brokers 110-112 may be executed and run in an environment in which applications 104-108 and adapters 114-118 are executed or may be executed and run in a separate, distinct environment.

From the brokers 110-112, the adapters 114-118 receive the data requests sent by the applications 104-108 and process the data requests as needed. Adapters 114-118 are coupled to respective data storages 126-130 and are able to speak the language and/or protocol of the data storages 126-130 in order to acquire the data therefrom. Adapters 114-118 may be executed and run in an environment in which applications 104-108 and brokers 110-112 are executed or may be executed and run in a separate, distinct environment.

Data storages 126-130 reside in computer readable storage media in one or more locations in common gateway platform environment 100. Data storages 126-130 may have similar protocols and configurations in one embodiment; however, various different types of protocols and configurations among the set of data storages 126-130 is also envisioned herein.

Common gateway platform 102 is configured to allow any application 104-108 to request the data from any data storage 126-130 without requiring the application 104-108 to directly connect to each data storage 126-130 and without requiring the application 104-108 to be configured with the data storage protocol necessary to communicate with the data storage 126-130 in order to acquire data therefrom. Instead, as disclosed herein, a common gateway platform provides a universal, common communication protocol that facilitates intercommunication among the applications 104-108, brokers 110-112, and adapters 114-118 to allow separation of the tasks of communicating with the clients 120-124 and the data storages 126-130. In this manner, the applications 104-108 are not required to be able to communicate with the data storages 126-130 to acquire data therefrom, and the adapters 114-118 are not required to be able to communicate with the clients 120-124 to supply the data thereto. The applications 104-108, therefore, are able to request and receive data in a common format/protocol regardless of the specific protocol needed to communicate with data storages 126-130.

Sources of data in common gateway platform environment 100 are not limited to data storages 126-130. A benefit of the common gateway platform protocol described herein includes the adaptability of some components into serving more than one function. In one example, clients 120-124 may have data stored thereon useful within common gateway platform 102 such as the client having data that could provide telemetry/usage data to the system to allow analytics. Data requests from clients 120-124 for use within common gateway platform environment 100 operate in a reverse order of that described above. Accordingly, a collaborative, distributed data system results.

Figure 3:
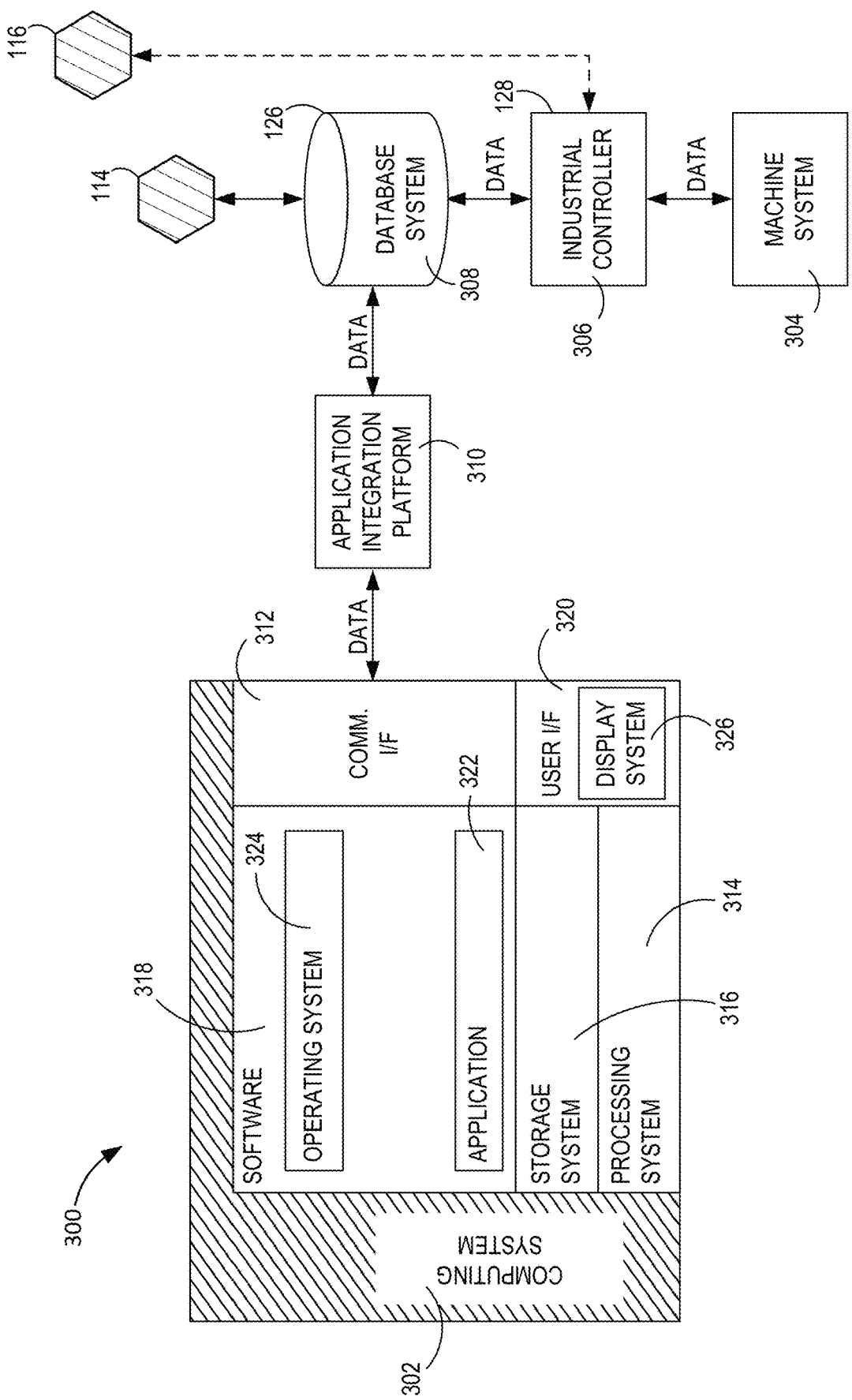
FIG. 3 is a block diagram that illustrates an industrial automation environment in an exemplary implementation.

Referring to FIG. 3, a block diagram is shown that illustrates an exemplary implementation of an industrial automation environment 300 from which data to be processed by adapters 114-118, brokers 110-112, and applications 104-108 is acquired. Industrial automation environment 300 provides an example of an industrial automation environment set up to produce data for the data gathering and presentation operations disclosed herein, but other environments could also be used. Industrial automation environment 300 includes computing system 302, machine system 304, industrial controller 306, database system 308, and application integration platform 310. Machine system 304 and controller 306 are in communication over a communication link, controller 306 and database system 308 communicate over a communication link, database system 308 and application integration platform 310 communicate over a communication link, and application integration platform 310 and computing system 302 are in communication over a communication link.

Industrial automation environment 300 comprises an automobile manufacturing factory, food processing plant, oil drilling operation, microprocessor fabrication facility, or some other type of industrial enterprise. Machine system 304 could comprise a sensor, drive, pump, filter, drill, motor, robot, fabrication machinery, mill, printer, or any other industrial automation equipment, including their associated control systems. A control system comprises, for example, industrial controller 306, which could include automation controllers, programmable logic controllers (PLCs), programmable automation controllers (PACs), or any other controllers used in automation control. Additionally, machine system 304 could comprise other industrial equipment, such as a brew kettle in a brewery, a reserve of coal or other resources, or any other element that may reside in an industrial automation environment 300.

Machine system 304 continually produces operational data over time. The operational data indicates the current status of machine system 304, such as parameters, pressure, temperature, speed, energy usage, operational equipment effectiveness (OEE), mean time between failure (MTBF), mean time to repair (MTTR), voltage, throughput volumes, times, tank levels, or any other performance status metrics. The operational data may comprise dynamic charts or trends, real-time video, or some other graphical content. Machine system 304 and/or controller 306 is capable of transferring the operational data over a communication link to database system 308, application integration platform 310, and computing system 302, typically via a communication network. Database system 308 could comprise a disk, tape, integrated circuit, server, or some other memory device. Database system 308 may reside in a single device or may be distributed among multiple memory devices.

Application integration platform 310 comprises a processing system and a communication transceiver. Application integration platform 310 may also include other components such as a router, server, data storage system, and power supply. Application integration platform 310 may reside in a single device or may be distributed across multiple devices. Application integration platform 310 may be a discrete system or may be integrated within other systems—including other systems within industrial automation environment 300. In some examples, application integration platform 310 could comprise a FACTORYTALK VANTAGEPOINT server system provided by Rockwell Automation, Inc.

The communication links over which data is exchanged between machine system 304, industrial controller 306, database system 308, application integration platform 310, and communication interface 312 of computing system 302 could use metal, air, space, optical fiber such as glass or plastic, or some other material as the transport medium—including combinations thereof. The communication links could comprise multiple network elements such as routers, gateways, telecommunication switches, servers, processing systems, or other communication equipment and systems for providing communication and data services. These communication links could use various communication protocols, such as TDM, IP, Ethernet, telephony, optical networking, packet networks, wireless mesh networks (WMN), local area networks (LAN), metropolitan area networks (MAN), wide area networks (WAN), hybrid fiber coax (HFC), communication signaling, wireless protocols, communication signaling, peer-to-peer networking over Bluetooth, Bluetooth low energy, Wi-Fi Direct, near field communication (NFC), or some other communication format, including combinations thereof. The communication links could be direct links or may include intermediate networks, systems, or devices.

Computing system 302 may be representative of any computing apparatus, system, or systems on which the event data saving processes disclosed herein or variations thereof may be suitably implemented. Computing system 302 provides an example of a computing system that could be used as either a server or a client device in some implementations, although such devices could have alternative configurations. Examples of computing system 302 include mobile computing devices, such as cell phones, tablet computers, laptop computers, and notebook computers, as well as any other type of mobile computing devices and any combination or variation thereof. Examples of computing system 302 also include desktop computers, server computers, and virtual machines, as well as any other type of computing system, variation, or combination thereof. In some implementations, computing system 302 could comprise a mobile device capable of operating in a server-like fashion which, among other uses, could be utilized in a wireless mesh network.

Computing system 302 includes processing system 314, storage system 316, software 318, communication interface 312, and user interface 320. Processing system 314 is operatively coupled with storage system 316, communication interface 312, and user interface 320. Processing system 314 loads and executes software 318 from storage system 316. Software 318 includes application 322 and operating system 324. Application 322 may include operations appropriate for implementing industrial automation environments in some examples. In this example, user interface 320 includes display system 326, which itself may be part of a touch screen that also accepts user inputs via touches on its surface. Computing system 302 may optionally include additional devices, features, or functionality not discussed here for purposes of brevity.

Database system 308 represents a data storage from which an adapter may be configured to acquire data. For example, database system 308 may be a data storage device equivalent to data storage 126 of FIG. 2 to which adapter 114 is coupled. Within industrial automation environment 300, however, database system 308 may not be the only data storage containing data from which an application (e.g., applications 104-108) may be configured to acquire data. In addition or alternatively to the connection of adapter 114 to database system 308 for the purpose of acquiring data from industrial automation environment 300, another of the adapters (e.g., adapter 116) may be connected to industrial controller 306, which may have an internal data storage from which data may be acquired.

Figure 4:
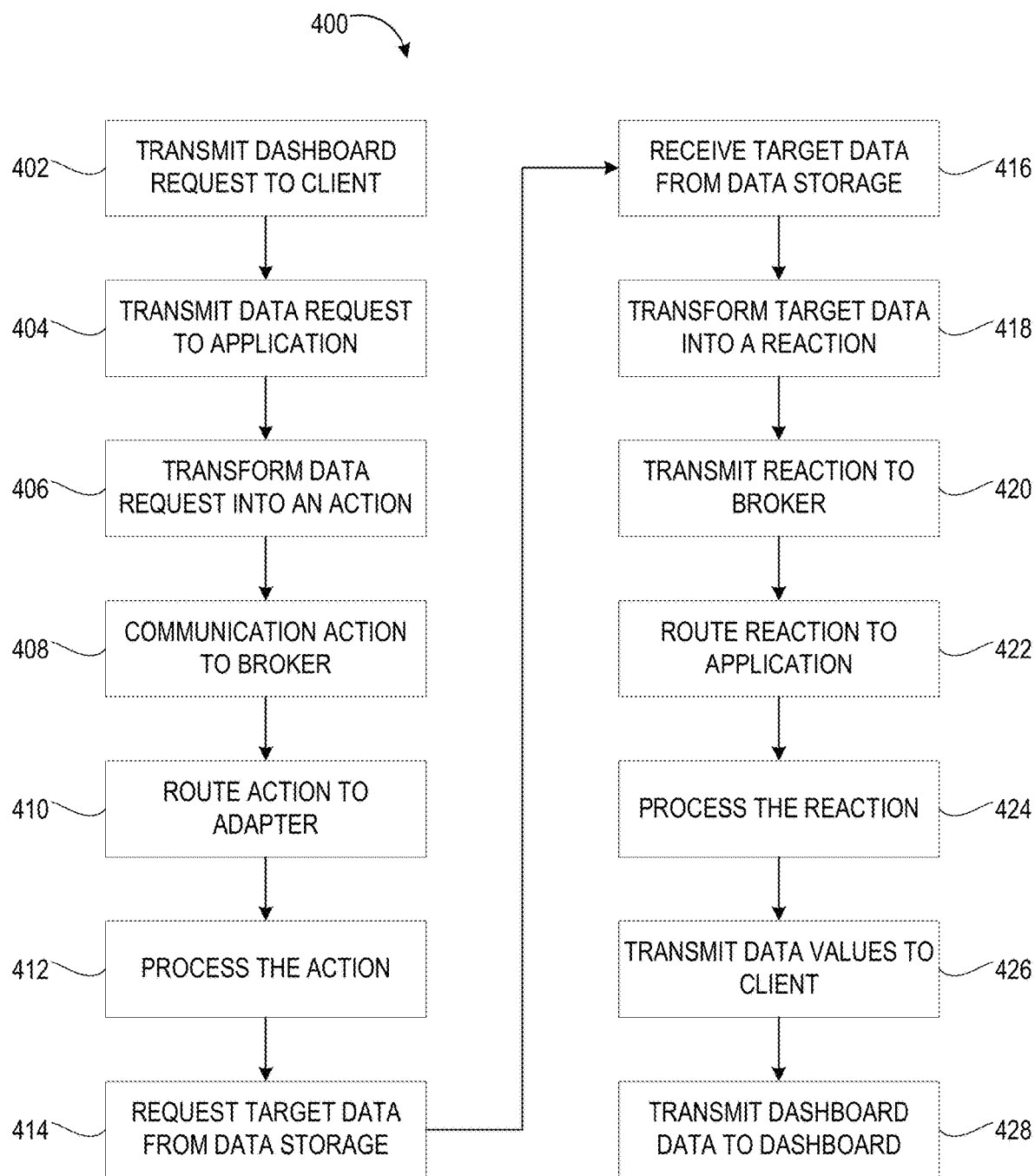
FIG. 4 is a flowchart illustrating a communication operation in accordance with the common gateway platform in an exemplary implementation.
Figure 5:
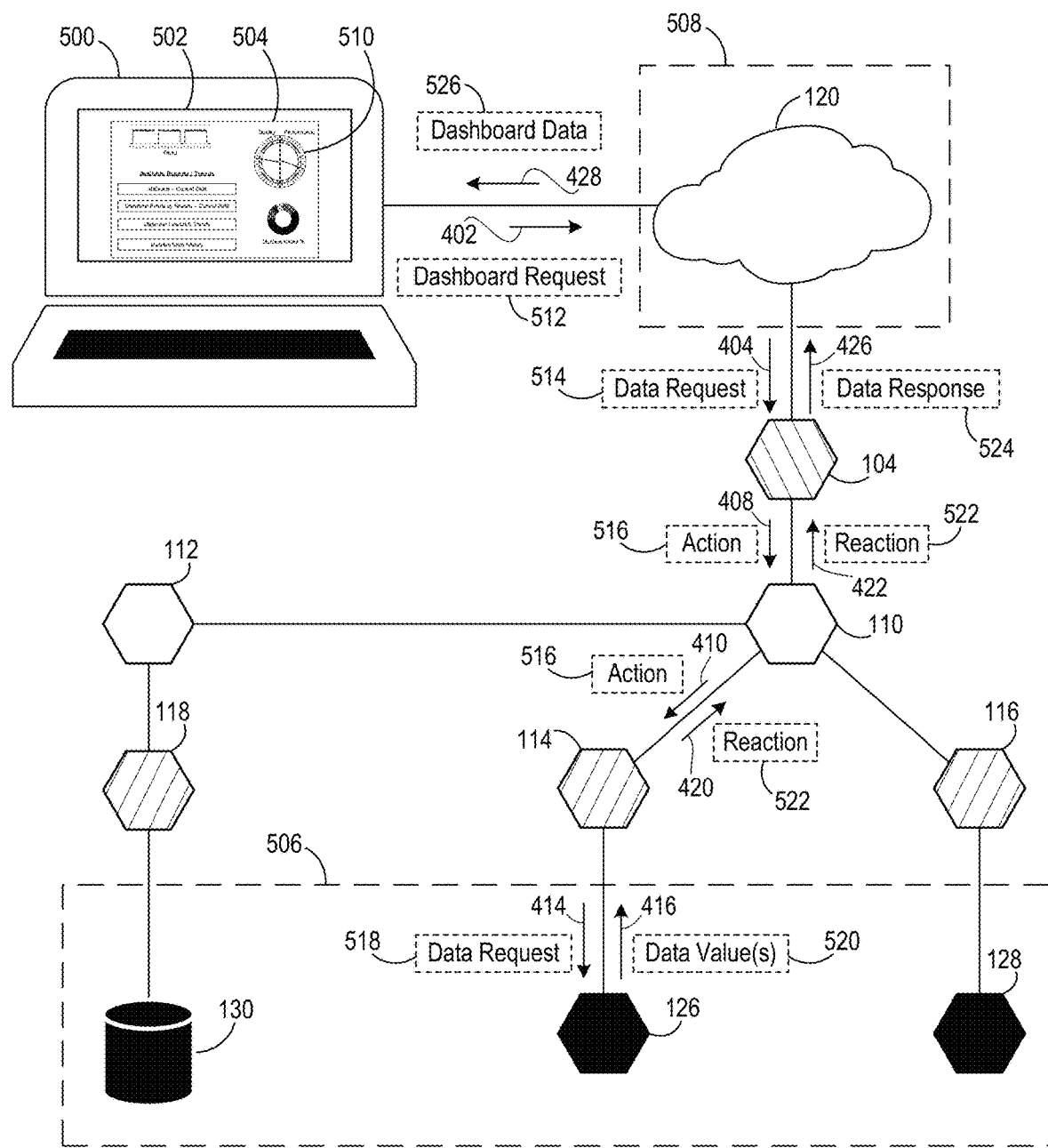
FIG. 5 is a block diagram that illustrates the communication operation of FIG. 4 in an exemplary implementation.

Referring to FIGS. 4 and 5, a communication operation 400 in accordance with the common gateway platform in an exemplary implementation is shown. FIG. 4 illustrates a flowchart referencing steps of communication operation 400, and FIG. 5 graphically illustrates the steps of communication operation 400. References to the flowchart steps will be indicated parenthetically.

As shown in FIG. 5, a computing system 500 includes a display 502 illustrating a dashboard 504 showing data values related to the operation of an industrial automation environment 506. While industrial automation environment 506 is illustrated as encompassing data storages 126-130, other configurations having multiple industrial automation environments 506, each having one or more combinations of data storages 126-130, is also envisioned herein. Dashboard 504, executed on computing system 500, is designed or configured to visually display data values acquired from industrial automation environment 506, calculations based on the acquired data values, analysis data, and the like. In one embodiment, computing system 500 is in communication with client 120, which is executed on a distinct computing system or service 508; however, in another embodiment, client 120 (and application 104 in addition) may be executed on computing system 500. Client 120 may be a software service providing bridging functionality between computing system 500 and application 104 via the Internet, for example. In another embodiment, computing system 500 may be directly connected to application 104 without client 120.

Dashboard 504 includes one or more visual (e.g., text-based or graphics-based) objects 510 from which to indicate industrial automation environment data. Accordingly, in order to visually depict the data, the data needs to be acquired from the industrial automation environment 506. As such, communication operation 400 includes transmitting (step 402) a dashboard request 512 to the client 120 that includes one or more data values corresponding with at least one of the visual objects 510 for display. The client 120 receives the dashboard request and transmits (step 404) a data request 514 to the application (e.g., application 104) to which it is connected. The data request may be a re-transmission of the dashboard request in one embodiment. However, in another embodiment, the client 120 may process the dashboard request to strip out information not necessary to requesting the data from the industrial automation environment 506.

Application 104 receives the data request 514 and transforms (step 406) the data request 514 into an action 516 having a format conforming with the configuration of the common gateway platform. As such, the format conforms with a common gateway platform protocol. In transforming the data request 514, the application 104 includes processing the data request 514 to determine the data being requested and to determine the target data storage to petition in order to acquire the requested data. The configuration of the common gateway platform protocol includes requesting the data from the specified data storage using a Uniform Resource Identifier (URI).

In one embodiment, the URI generated by the application 104 identifies the scheme or type of the target adapter (e.g., adapters 114-118) connected to the target data storage having the requested data, the hostname or adapter identifier of the target adapter instance, the path within the industrial automation environment 506 in which to find the target data storage, and the identification (ID) or variable name identification of the variable name or storage location on the data storage containing the requested data. Using non-specific terms, the URI may be formatted as: scheme://hostname/path#ID. The path and ID formats may vary based on the scheme. An example of a target-specific URI is as follows: cip://cda/AB-ETH1/10.88.55.77/Backplane/0/3/192.168.1.43/Backplane/5#Tag1
where the scheme is "cip", the hostname is "cda", the path is "AB-ETH1/10.88.55.77/Backplane/0/3/192.168.1.43/

Backplane/5", and the ID is "Tag1". In this example, the "Tag1" variable has the target data desired to be returned. This variable is accessible by the "cda" adapter at the "AB-ETH1 . . . Backplane/5" path. In addition, the "cip" scheme identifies the adapter type as a CIP (or Common Industrial Protocol) type. Other example schemes may include "ftld" for a FactorTalk Live Data scheme provided by Rockwell Automation, Inc.; "sql" for an SQL scheme; and the like.

In addition to the URI, action 516 further includes a type indicator for the type of action requested. Action types include data creation, data reading, data updating, data deleting, data monitoring and commands for the target adapter to execute as examples. URI data also included in the action 516 includes data tracking information to track the data requested throughout the process. Additional optional data may include an update rate for the action (e.g., monitor the data value every 2 seconds), an update type for the action (e.g., when the variable changes), and other options designed to be returned with the target data after it is retrieved by the target adapter.

While the application 104 generates the URI within the action 516, the application 104 is not required to know the location of the target adapter within the common gateway platform environment or to know which broker the target adapter is connected to. Instead, application 104 communicates (step 408) the action 516 to the broker 110, which is configured to know where to find the target adapter within the common gateway platform environment. Accordingly, broker 110 routes (step 410) the action 516 to the appropriate target adapter (e.g., adapter 114) at least based on the URI information within the action 516. Accordingly, the action 516 prepared by the application 104 for the intended or target adapter 114 is communicated to the target adapter 114 exclusively through the broker in one embodiment without a direct connection of the application 104 to the target adapter 114. In the case where the target adapter corresponds to an adapter connected to another broker (e.g., broker 112), broker 110 communicates the action 516 to the other broker for processing as disclosed herein. Accordingly, a network of brokers 110-112 may be created for intercommunication therebetween in a large common gateway platform environment.

Target adapter 114 receives and processes the action 516 (step 412) to determine the action commands therein. The behavior of the adapter 114 is based on the action type. For example, if the action 516 includes a "monitor" action type, adapter 114 begins to monitor the target data based on the update rate and type specified in the action 516. Using the example above, an "onchange" monitoring action causes the adapter 114 to request (step 414) the target data via a data request 518. When the data storage (e.g., data storage 126) returns (step 416) the requested data value 520 and the data value 520 is determined to have a changed value from a previous value, transmit the new value back to the broker 110. The adapter 114 may constantly poll the target data in an "onchange" monitoring action to quickly report a change in the data value, or, to reduce processing time, the polling times may be lengthened. The "onchange" monitoring action thus creates a value-based criterium independent of a timer threshold for the adapter 114 to use to monitor the data value 520. In another example, a time-based monitoring action specifying data values to be returned every 2 seconds causes the adapter 114 to acquire the variable data every 2 seconds and transmit the value, whether changed or not, back to the broker 110. The time-based monitoring action thus creates a time-based criterium for the adapter 114 to use to monitor the data value 520 independent whether the value of the data has changed.

The adapter 114 transforms (step 418) the data acquired from the data storage 126 conforming with a data response message protocol into a reaction 522 having a format conforming with the configuration of the common gateway platform protocol prior to transmitting (step 420) the requested data back to the broker 110. Embodiments of the invention are not restricted to creating a single reaction 522 in response to an action 516. Instead, more than one reaction 522 may be created based on the configuration of the system and/or the configuration of the action 516. The data response message protocol may be different from the common gateway platform protocol. Similar to the action 516, the reaction 522 includes the URI, data tracking information, and any options designed to be returned with the target data after being retrieved that were sent in the original action 516. In addition, the reaction 522 includes the values of the data requested and may include the data type of the values, an update rate for the action (e.g., monitor the data value every 2 seconds), an update type for the action (e.g., when the variable changes), and reaction tracking information. The URI within the reaction 522 allows the adapter 114 to be ignorant regarding the location of the application 104 within the common gateway platform environment. Like the location of the adapter 114, the location of the application 104 within the common gateway platform environment is known to the broker 110. Accordingly, the broker 110 routes (step 422) the reaction 522 back to the appropriate requesting application 104 at least based on the tracking information. That is, the broker 110 is configured to make sure tracking numbers are managed properly so the requesting application 104-108 properly receives the data that it requested. Returning the data using the tracking information helps to ensure that any data optimized by the broker is returned to the appropriate requester.

Application 104 receives and processes the reaction 522 (step 424) to parse the data values and other information found therein. The data values are transformed into a data response 524 having a format appropriate for returning (step 426) the data values to client 120, which in turn, provides the data values together with any other information relevant to dashboard data 526 returned (step 428) to the dashboard 504 for display.

In the case where the action type of the action 516 does not seek the return of a data value from a data storage such as in the case of an action to create data update data or delete data, for example, the reaction 522 may be generated to include an acknowledgment of a successful completion of the action type or an error indicating a reason for a failed completion of the action type. In this case, the application 104, client 120, or computing system 500 may be configured to appropriately react to such acknowledgment reaction response. However, based on the action type of the action 516, it is possible that no reaction 522 is to be created. For example, an action type calling for storing data in a data storage 126-130 may not require acknowledgement of a successful storing action, and in this case, a reaction 522 might not be created in response to a successful data storage activity.

According to embodiments of the invention, each application 104-108 may be created using any type of programming language protocol (e.g., C++, C #, TypeScript, JavaScript, and the like), and each broker 110-112 and adapter 114-118 may also be created using any type of the programming language protocols. In particular, an application 104-108 may be created in a programming language protocol that is different from the programming language protocol of the adapter 114-118 that will be responding to the application's action message. Additionally, a broker 110-112 may be created in yet another programming language protocol that is different from the programming language protocols of the application 104-108 and adapters 114-118. Because the action and reaction messages are communicated throughout the common gateway protocol environment having a common protocol, having different programming language protocols existing among the applications 104-108 and adapters 114-118 avoids incompatibility that might exist if the applications 104-108 and adapters 114-118 were to attempt to communicate according to their respective programming language protocols.

Figure 6:
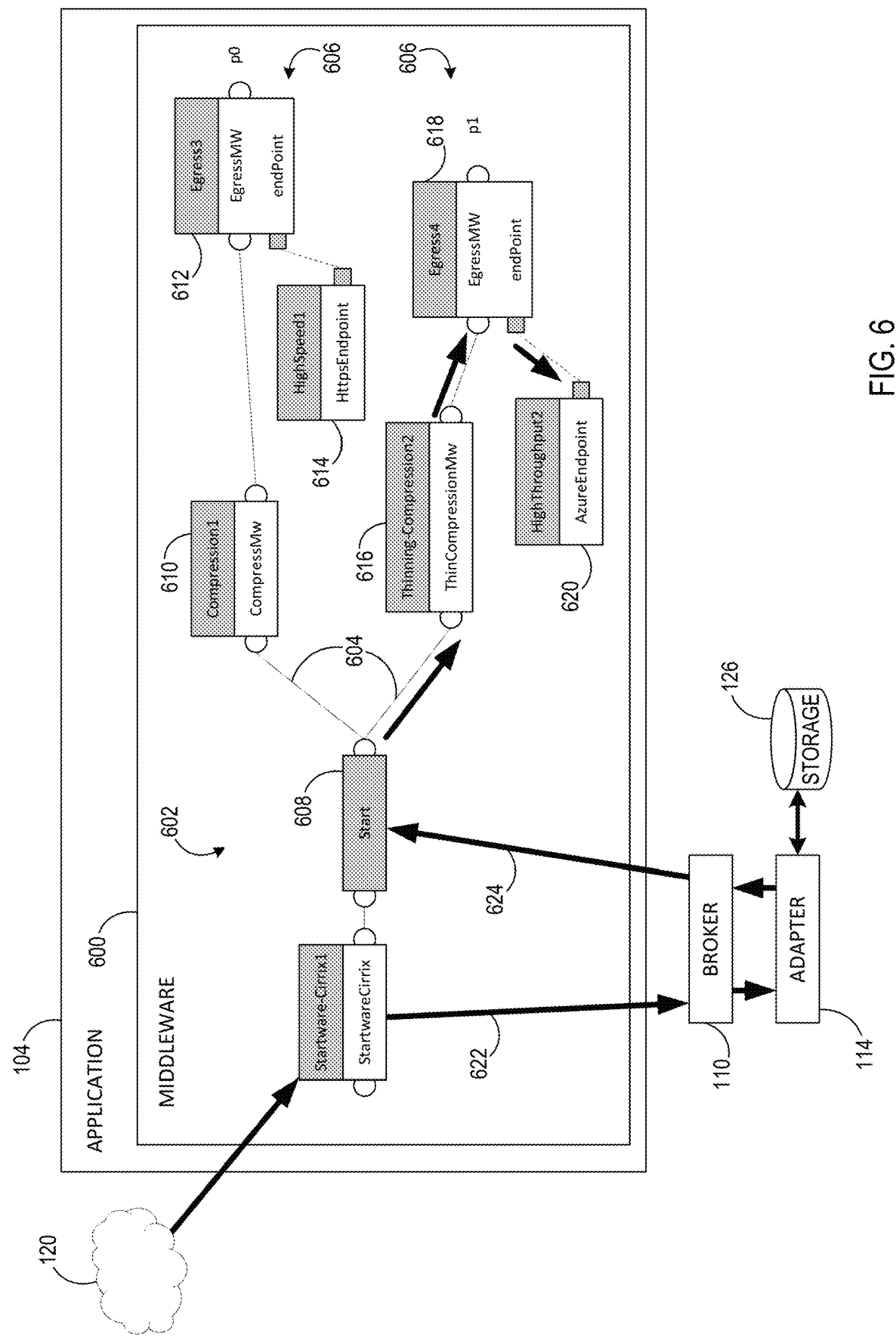
FIG. 6 is a block diagram that illustrates a portion of the common gateway platform environment of FIG. 2 in an exemplary implementation.

FIG. 6 illustrates a block diagram showing an example of application 104 processing a returned reaction from adapter 114 in an implementation. Application 104 includes a portion thereof executing a middleware component 600 having a plurality of functions 602 graphically illustrated in FIG. 6.

Using a graphical tool, a designer may lay out and organize graphical functions 602 as needed to design the functionality of the middleware component 600. By joining functions 608-620 together via function connections 604, middleware paths or data pipelines (i.e., data pipeline identifiers) 606 may be defined. As illustrated, two data pipelines (p0 and p1) extend from a start function block 608. Data pipeline p0 includes a compression function block 610 configured to perform a compressing function on data prior to egressing 612 the compressed data to a HttpsEndpoint 614. Data pipeline p1 includes a thinning function block 616 configured to perform a thinning function on data prior to egressing 618 the thinned data to an AzureEndpoint 620.

As shown via bold arrows in FIG. 6, an action 622/reaction 624 scenario such as that described above or as otherwise contemplated herein to obtain data from data storage 126 results in the reaction 624 returning data values to start function block 608 of middleware component 600. As described above, actions (e.g., 516, 622) that conform with the configuration of the common gateway platform may include optional information that stays with the actions and reactions throughout the process. In one implementation, middleware component 600 is configured to route data values through a particular data pipeline 606 based on an identifier indicating which data pipeline is intended to process returned data values. Accordingly, the optional information may include routing information indicating how processed reaction data should be routed within the application 104. In the example shown, action 622, which includes a data request from data storage 126, also includes information in the optional information that is returned to application 104 in the reaction 624 for data to be acted on by data pipeline p1. That is, the optional information may include a data pipeline 'p1' identifier such that processing of the reaction 624 by middleware 600 at, for example, the start function block 608 causes the processed reaction data to be routed along the p1 data pipeline.

As data flows through middleware component 600, the data can be used in many ways. In one embodiment, like a canal, reaction data can be stored and accumulated for later transmission as a larger, combined package. For example, the data could be passed to another part of the system (e.g., an endpoint) that is written in a different programming language where it is temporarily stored. The data may then be pulled from the endpoint when data combination is executed. In another embodiment, new values can be produced to perform stream analytics on action and reaction data. In another embodiment, reaction data can be used to produce new action data to be sent to the system. For example, in response to a trigger found in the reaction data, a send action can occur to send data to the system. In another embodiment, the data can be processed in multiple data pipelines or the data can be transformed into a different form of data. In another embodiment, the data or the flow of the data can be visualized in a user interface component. In another embodiment, middleware component 600 can use an endpoint to egress it completely out of the system.

Figure 7:
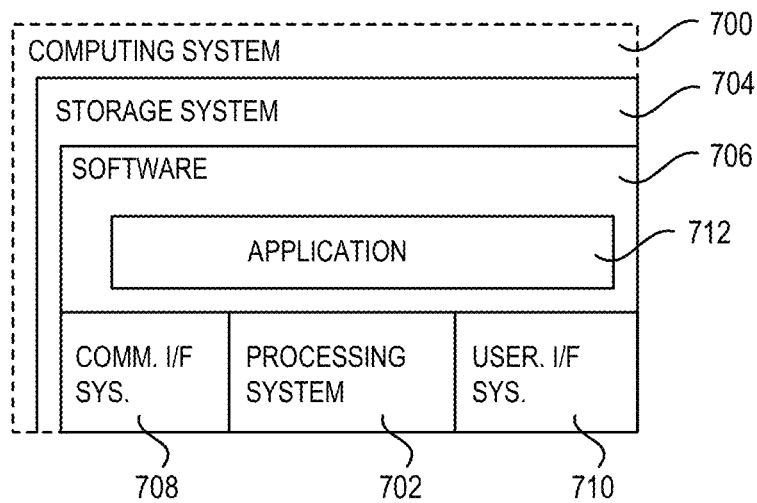
FIG. 7 illustrates a computing system suitable for implementing the software technology disclosed herein, including any of the applications, architectures, elements, processes, and operational scenarios and sequences illustrated in the Figures and discussed below in the Detailed Description.

FIG. 7 illustrates a computing system 700, which is representative of any system or collection of systems in which the various applications, services, scenarios, and processes disclosed herein may be implemented. Examples of computing system 700 include, but are not limited to, desktop computers, laptop computers, tablet computers, computers having hybrid form-factors, mobile phones, smart televisions, wearable devices, server computers, blade servers, rack servers, and any other type of computing system (or collection thereof) suitable for carrying out the application launching operations described herein. Such systems may employ one or more virtual machines, containers, or any other type of virtual computing resource in the context of supporting enhanced group collaboration.

Computing system 700 may be implemented as a single apparatus, system, or device or may be implemented in a distributed manner as multiple apparatuses, systems, or devices. Computing system 700 includes, but is not limited to, processing system 702, storage system 704, software 706, communication interface system 708, and user interface system 710. Processing system 702 is operatively coupled with storage system 704, communication interface system 708, and user interface system 710. Computing system 700 may be configured or programmed to execute the applications 104-108, brokers 110-112, and adapters 114-118 herein.

Processing system 702 loads and executes software 706 from storage system 704. Software 706 includes application 712, which is representative of a software application executed by a processor and programmed to execute the methods described herein. When executed by processing system 702 to facilitate and guide pre-booking requests, application 712 directs processing system 702 to operate as described herein for at least the various processes, operational scenarios, and sequences discussed in the foregoing implementations. Computing system 700 may optionally include additional devices, features, or functionality not discussed for purposes of brevity.

Referring still to FIG. 7, processing system 702 may comprise a micro-processor and other circuitry that retrieves and executes software 706 from storage system 704. Processing system 702 may be implemented within a single processing device, but may also be distributed across multiple processing devices or sub-systems that cooperate in executing program instructions. Examples of processing system 702 include general purpose central processing units, application specific processors, and logic devices, as well as any other type of processing device, combinations, or variations thereof.

Storage system 704 may comprise any computer readable storage media readable by processing system 702 and capable of storing software 706. Storage system 704 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations, storage system 704 may also include computer readable communication media over which at least some of software 706 may be communicated internally or externally. Storage system 704 may be implemented as a single storage device, but may also be implemented across multiple storage devices or sub-systems co-located or distributed relative to each other. Storage system 704 may comprise additional elements, such as a controller, capable of communicating with processing system 702 or possibly other systems.

Software 706 in general, and application 712 in particular, may be implemented in program instructions and among other functions may, when executed by processing system 702, direct processing system 702 to operate as described with respect to the various operational scenarios, sequences, and processes illustrated herein. For example, application 712 may include program instructions for executing components of the common gateway platform environments 100, 506 herein.

In particular, the program instructions may include various components or modules that cooperate or otherwise interact to carry out the various processes and operational scenarios described herein. The various components or modules may be embodied in compiled or interpreted instructions, or in some other variation or combination of instructions. Software 706 may include additional processes, programs, or components, such as operating system software, virtual machine software, or other application software, in addition to or that include application 712. Software 706 may also comprise firmware or some other form of machine-readable processing instructions executable by processing system 702.

In general, application 712 may, when loaded into processing system 702 and executed, transform a suitable apparatus, system, or device (of which computing system 700 is representative) overall from a general-purpose computing system into a special-purpose computing system customized to enhance entity classification operations. Indeed, encoding application 712 on storage system 704 may transform the physical structure of storage system 704. The specific transformation of the physical structure may depend on various factors in different implementations of this description. Examples of such factors may include, but are not limited to, the technology used to implement the storage media of storage system 704 and whether the computer-storage media are characterized as primary or secondary storage, as well as other factors.

For example, if the computer readable storage media are implemented as semiconductor-based memory, application 712 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 708 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 710 may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 710. In some cases, the input and output devices may be combined in a single device, such as a display capable of displaying images and receiving touch gestures. The aforementioned user input and output devices are well known in the art and need not be discussed at length here.

User interface system 710 may also include associated user interface software executable by processing system 702 in support of the various user input and output devices discussed above. Separately or in conjunction with each other and other hardware and software elements, the user interface software and user interface devices may support a graphical user interface, a natural user interface, or any other type of user interface, in which a user interface to an application may be presented.

Communication between computing system 700 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well-known and need not be discussed at length here. In any of the aforementioned examples in which data, content, or any other type of information is exchanged, the exchange of information may occur in accordance with any of a variety of well-known data transfer protocols.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. One or more non-transitory computer-readable storage media having program instructions stored thereon, wherein the program instructions, when executed by a computing system, direct the computing system to:
    execute a common gateway platform environment comprising:
        an adapter connected to an application and comprising an adapter name identification; and
        a broker connected to the adapter;
        wherein the broker is configured to:
            receive, from the application, an action that accords with a common gateway platform protocol and comprises:
                a uniform resource identifier (URI) comprising an adapter identifier that identifies the adapter by its adapter name identification, and a variable name identification that identifies data to be acquired; and
                an adapter instruction for the adapter to acquire, from an industrial automation environment communicatively connected to the adapter, the data;
            identify the adapter based at least on the adapter identifier;
            transmit the action to the adapter;
            receive, from the adapter, a reaction comprising the URI;
            associate the URI with the application;
            identify the application based at least on the reaction by processing the URI and determining the application associated with the URI; and
            transmit the reaction to the application; and
        wherein the adapter is configured to:
            receive the action from the broker;
            acquire the data from the industrial automation environment based at least on the adapter instruction;
            generate the reaction comprising the data; and
            transmit the reaction to the broker.

2. The one or more non-transitory computer-readable storage media of claim 1 wherein the adapter is configured to receive the action exclusively through the broker.

3. The one or more non-transitory computer-readable storage media of claim 1, wherein the application is configured to generate the URI.

4. The one or more non-transitory computer-readable storage media of claim 1, wherein the URI further comprises a scheme configured to identify a type of the adapter.

5. The one or more computer-readable storage media of claim 3, wherein the application is further configured to generate the action.

6. The one or more non-transitory computer-readable storage media of claim 1, wherein the adapter instruction comprises an instruction configured to cause the adapter to:
    monitor the data; and
    based on at least one monitoring criterium, re-generate the reaction to create a re-generated reaction and re-transmit the re-generated reaction to the broker.

7. The one or more non-transitory computer-readable storage media of claim 6, wherein the application comprises a middleware portion comprising a plurality of data pipelines;
    wherein the action further comprises a data pipeline identifier;
    wherein the reaction further comprises the data pipeline identifier; and
    wherein the application is further configured to:
        identify the data pipeline identifier based on the reaction; and
        process the data in a data pipeline of the plurality of data pipelines identified by the data pipeline identifier.

8. A computer-implemented method of acquiring data generated by an industrial automation machine in an industrial automation environment, the method comprising:
    receiving, via a broker and from an application, an action that accords with a common gateway platform protocol and comprises:
        a uniform resource identifier (URI) comprising an adapter identifier and a variable name identification that identifies the data generated by the industrial automation machine; and
        an adapter instruction that causes an adapter to acquire the data generated by the industrial automation machine;
    determining, via the broker, the adapter based at least on the adapter identifier;
    routing, via the broker, the action to the adapter;
    acquiring, via the adapter, the data generated by the industrial automation machine;
    transmitting, from the adapter and to the broker, a reaction comprising the data generated by the industrial automation machine and the URI;
    associating, via the broker, the URI with the application;
    identifying, via the broker, the application based at least on processing the URI and determining the application associated with the URI; and
    routing, via the broker, the reaction to the application.

9. The computer-implemented method of claim 8, further comprising generating the action via the application.

10. The computer-implemented method of claim 8, wherein the URI further comprises a scheme configured to identify a type of the adapter.

11. The computer-implemented method of claim 8, further comprising generating the reaction via the adapter.

12. The computer-implemented method of claim 8, wherein acquiring, via the adapter, the data generated by the industrial automation machine comprises:
    monitoring, via the adapter, the data generated by the industrial automation machine; and
    in response to at least one monitoring criterium, obtaining the data generated by the industrial automation machine from a data storage device.

13. The computer-implemented method of claim 12, wherein the at least one monitoring criterium comprises a monitoring criterium selected from the group consisting of a time-based criterium independent of a value of the data generated by the industrial automation machine and a value-based criterium independent of a timer threshold.

14. A system to acquire data generated by an industrial automation machine in an industrial automation environment, the system comprising:
a machine system comprising the industrial automation machine; and
a common gateway platform system, communicatively coupled to the machine system, comprising:
one or more applications;
one or more brokers communicatively connected to the one or more applications; and
a plurality of adapters communicatively connected to the one or more brokers;
wherein a first broker of the one or more brokers is configured to:
receive, from a first application of the one or more applications, an action message that accords with a common gateway platform protocol and comprises a uniform resource identifier (URI) comprising an adapter identifier and a variable name identification that identifies data generated by the industrial automation machine;
identify a first adapter of the plurality of adapters based at least on the action message;
transmit the action message to the first adapter; and
subsequent to receiving from the first adapter, a reaction message comprising the URI:
associate the URI with the first application; and
identify, based at least on the reaction message, the first application by processing the URI and determining the first application associated with the URI; and
wherein the first adapter is configured to:
acquire the data generated by the industrial automation machine based at least on a processing of the action message;
create, based at least on the data generated by the industrial automation machine, the reaction message; and
transmit, to the broker via the reaction message, the data generated by the industrial automation machine.

15. The system of claim 14, wherein the first adapter is configured to create, according to the common gateway platform protocol, the reaction message.

16. The system of claim 15, wherein the first application is configured to transform the data generated by the industrial automation machine in the reaction message into a data response message configured according to a data response message protocol different from the common gateway platform protocol.

17. The system of claim 16, wherein each adapter of the plurality of adapters comprises a distinct identification within the common gateway platform system; and
wherein the first broker, in being configured to identify the first adapter, is configured to identify the first adapter based on an adapter identifier within the action message.

18. The system of claim 17, wherein the first adapter is connected to a second broker of the one or more brokers; and
wherein the first broker, in being configured to transmit the action message to the first adapter, is configured to transmit the action message to the second broker, the second broker configured to route the action message to the first adapter.

19. The system of claim 14, wherein the first application is programmed according to a first programming language protocol; and
wherein the first adapter is programmed according to a second programming language protocol different from the first programming language protocol.

20. The system of claim 14, wherein the first broker is further configured to consolidate multiple action messages for data from the one or more applications into a single action message transmitted to the first adapter.

* * * * *